No. 860,998. PATENTED JULY 23, 1907.
C. P. STEINMETZ.
CONTROLLING ALTERNATING CURRENT MOTORS.
APPLICATION FILED JAN. 25, 1904.
3 SHEETS—SHEET 1.

Witnesses:

Inventor:
Charles P. Steinmetz
by Albert G. Davis
Att'y.

Inventor
Charles P. Steinmetz,

No. 860,998. PATENTED JULY 23, 1907.
C. P. STEINMETZ.
CONTROLLING ALTERNATING CURRENT MOTORS.
APPLICATION FILED JAN. 25, 1904.

3 SHEETS—SHEET 3.

WITNESSES:
Benjamin B. Hull
Allen Oxford

INVENTOR.
Charles P. Steinmetz,
BY Albert G. Davis
ATTORNEY.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

CONTROLLING ALTERNATING-CURRENT MOTORS.

No. 860,998.

Specification of Letters Patent.

Patented July 23, 1907.

Application filed January 26, 1904. Serial No. 190,437.

*To all whom it may concern:*

Be it known that I, CHARLES P. STEINMETZ, a citizen of the United States, residing at Schenectady, county of Schenectady, State of New York, have invented certain new and useful Improvements in Controlling Alternating-Current Motors, of which the following is a specification.

My invention relates to the control of alternating-current motors of the type known as repulsion motors, and comprises both a novel method of control and a novel system by means of which the said method may be carried into effect.

It has heretofore been proposed to control repulsion motors both as regards speed and torque by varying the relative angular displacement between the line of the primary field and the line of the short-circuiting brushes on the secondary member, and although this method may be utilized for controlling the speed and torque of a repulsion motor over any desired range, it is open to the objection that the sparking at the brushes at starting is considerably increased when the angle of shift between the primary field and the short-circuiting brushes is large. The method constituting my present invention involves the combination with the method of control above referred to of a control of the potential at the motor terminals.

By the control constituting my present invention, I am enabled to extend the range of speed and torque variation beyond that which can be obtained by shifting the commutator brushes or the line of magnetization of the primary member, while at the same time retaining all the advantages incident to this latter method of control.

Figure 5:
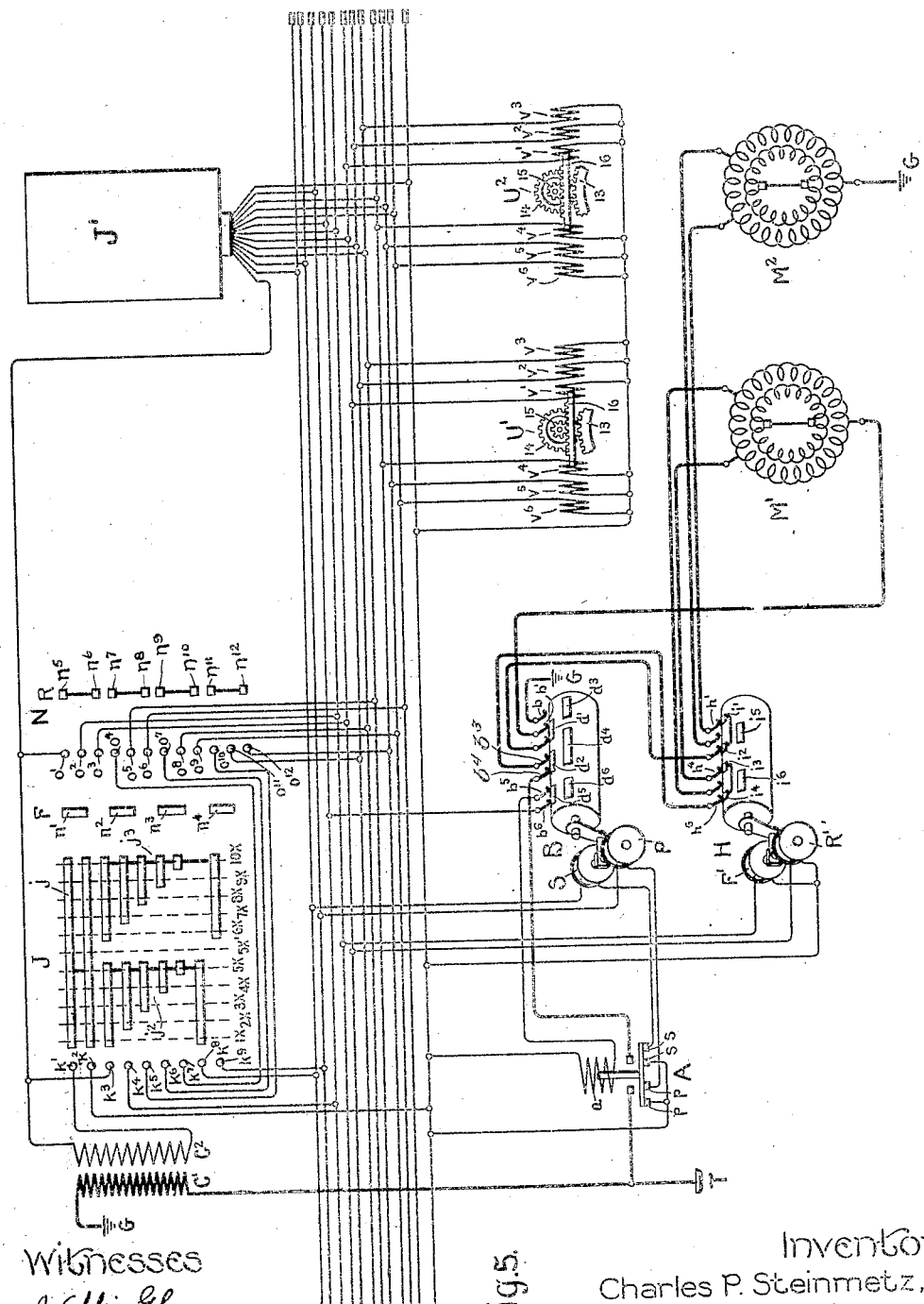
Figure 6:
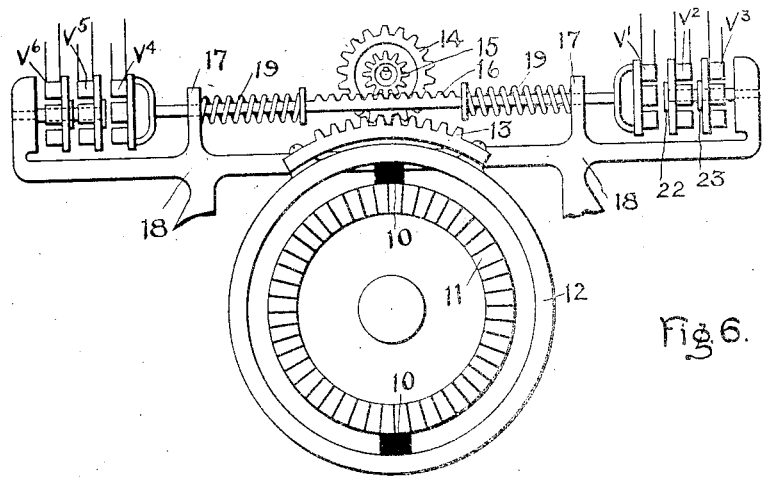
Figure 7:
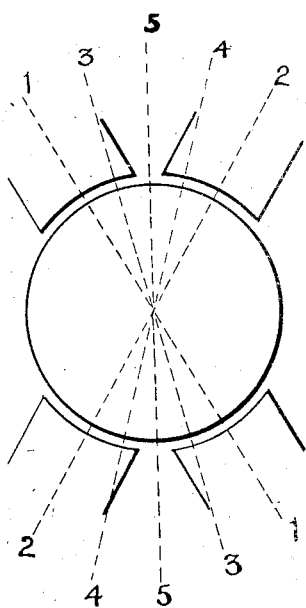
Figure 8:
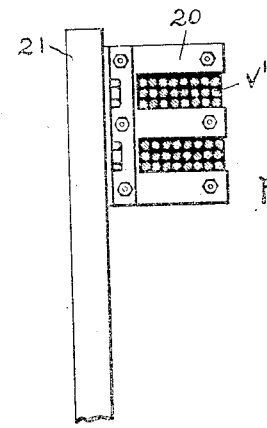

My invention will be better understood by reference to the following description taken in connection with the accompanying drawings, in which Figures 1 to 4 inclusive are diagrams illustrating one way of practicing my invention; Fig. 5 is a diagram of a complete system of control arranged to carry my invention into effect, the said system being adapted for the control of the motors on a car or train; Fig. 6 shows a form of brush-shifting mechanism adapted to my invention; Fig. 8 shows a detail of the brush-shifting mechanism; and Fig. 7 is an explanatory diagram.
In the particular embodiment of my invention which I have illustrated in my present application, the motors are arranged to be connected for starting in a series group or groups with the short-circuiting commutator brushes on the secondary members displaced by a maximum angle from the line of the primary field. To increase the speed of the motors the short-circuiting brushes are arranged to be shifted step by step until they lie along a line displaced in the neighborhood of 15° from the line of the primary field. The motor con-
nections are then changed from series to multiple grouping and at the same time the commutator brushes are returned to the position of maximum angular displacement, and finally the commutator brushes are moved step by step, as before, until they are brought to the position in which the greatest torque per volt ampere is obtained, this position depending somewhat upon the design of the motor, but being in general in the neighborhood of 15° from the line of the primary field.

Figure 1:
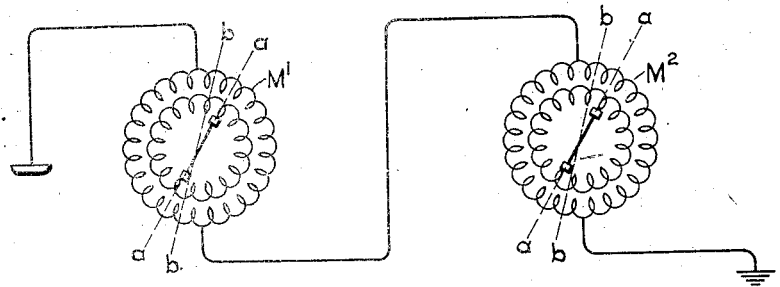
Figure 2:
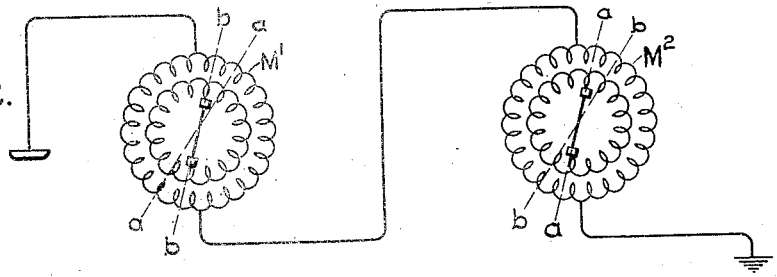
Figure 3:
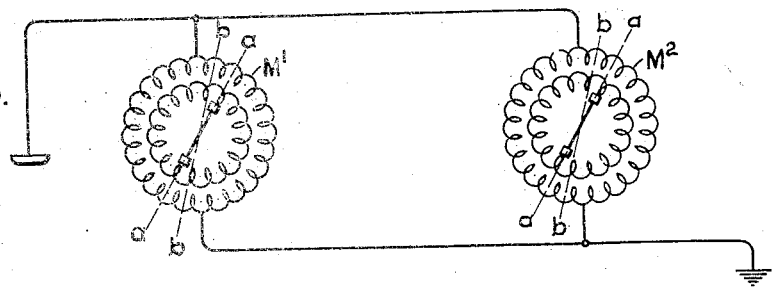
Figure 4:
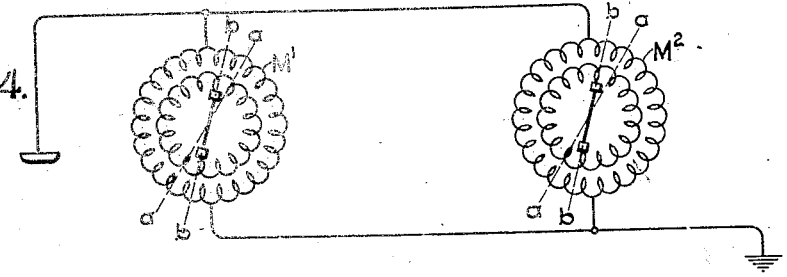

Referring to Figs. 1 to 4 inclusive which illustrate diagrammatically the motor control above described, $M'$ $M^2$ represent two repulsion motors having their primary windings connected in series between trolley and ground. In Fig. 1 the short-circuiting brushes of the secondary member are shown positioned along the line $aa$. This is the starting position. In order to increase the speed of the motors the short-circuiting brushes are gradually shifted until they lie along the line $bb$. This arrangement is shown in Fig. 2 of the drawings and corresponds to the full-series position in the ordinary series-parallel control of direct-current motors. In order to obtain a still higher speed the connections of the motors are shifted from series to parallel, the commutator brushes at the same time being returned to the position of maximum angular displacement. The connections for this position are indicated in Fig. 3 of the drawing and correspond to the first multiple position in the ordinary series-parallel control of direct-current motors. To increase the speed still further the short-circuiting brushes are again shifted from their position along the line $aa$ to a position along the line $bb$, as shown in Fig. 4, the connections illustrated in this diagram corresponding to the full-multiple position of the ordinary series-parallel control of direct-current motors.

Since my invention is especially applicable to the control of motors driving railway cars or trains, I have illustrated as the preferred embodiment a complete control system suitable for application to a single car or to one of the cars of a train which is to be operated from a master-controller located at any desired point. In illustrating this embodiment of my invention I have shown only a pair of motors connected with their switches in a single work circuit, with the controlling devices for the motors and switches connected to a system of conductors to which is also connected a single master-controller. It will be understood that the circuits for a single car are here shown, and that the system of conductors may be extended to any length and that the controlling devices for any number of groups of motors, as well as any number of master-controllers, may be connected thereto. Terminal connections are indicated at each end of the system of conductors, and, as train-control systems are well known in the art, it is not necessary to illustrate the circuits for the other cars, each car being merely a duplication of the system as shown.

In Fig. 5, the motors M′, M² are shown connected with their switches B, H and A, which will be described later, in the work circuit shown in heavy lines connected to the trolley or collecting device T. The controlling devices for these switches, and for the brush-shifting devices shown diagrammatically by U′, U², are connected to the system of train conductors to which is also connected the master-controller J′. J′ is shown with its contacts developed on a plane surface at J and N. The train conductors and the connecting leads to the controlling devices and master-controller comprise the control circuit, which is shown in light lines and which is connected to the transformer secondary C². Thus the voltage in the control circuit is independent of that in the work circuits and may be as low as desired.

Now taking up the work circuit in detail, it will be seen that the current entering the trolley T divides, part passing to the main switch A and part through the transformer primary C′ to ground. This latter circuit furnishes the current for the control circuit, which will be considered later. The circuit passing through main switch A forms the work circuit, which will be explained first. After passing through main switch A the current goes to the series-parallel switch B, which consists of the stationary contacts $b$, $b'$, $b^2$, etc. and the moving contacts $d'$, $d^2$, etc. From there the current passes to the reversing switch H, comprising the stationary contacts $h'$, $h^2$, etc. and the movable contacts $i'$, $i^2$, etc. From there the current passes to the motors M′ and M². It will be seen that motors M′ and M² have three taps brought out from the field, the two upper taps being connected to stationary contacts of the reversing switch H. Thus it will be seen that by shifting the connection from the source of current from one of the upper taps of the motors to the other the direction of magnetization may be varied by an angle proportional to the distance between the two taps. It is by this means that the reversal of the motor is obtained. This method of reversal will be explained later, but for the present it is sufficient to understand that when the source of current is shifted from one of the upper taps to the other, the direction of rotation of the motors is reversed. Thus when the lower movable contacts of switch H are in contact with the stationary contacts $h$, the current will enter the right-hand upper tap of the motors and the motors will run in one direction, while when the upper movable contacts of switch H are engaging the stationary contacts as shown in the drawing, the current enters the left-hand motor taps and the motors run in the other direction. Now suppose main switch A to be closed and the movable contacts $d'$, $d^2$, etc. of series-parallel switch B to be moved to engage the stationary contacts $b'$, $b^2$ etc., as shown in the drawing, and the upper movable contacts of switch H be moved to engage the stationary contacts $h'$, $h^2$, etc., the circuit is then as follows: Current passes from main switch A to stationary contact $b^5$, to movable contact $d^2$, to stationary contact $b^3$, to stationary contact $h^5$ of the reversing switch, to movable contact $i^2$, to movable contact $i'$, to stationary contact $h^4$, to left-hand upper tap of motor M′, out at lower tap of motor M′, to stationary contact $b'$, to movable contact $d'$, to stationary contact $b^2$, to stationary contact $h^2$, to movable contact $i^2$, to movable contact $i'$, to stationary contact $h'$, through motor M² to ground G. Thus the two motors are in series. If now the movable contacts $d^3$ and $d^4$ of switch B are moved upwards to engage the stationary contacts $b'$, $b^2$, $b^3$ and $b^4$, the motors will be thrown into parallel, as will be evident upon tracing out the connections. Thus the relative connection of the motors is controlled by series-parallel switch B, while the direction of rotation is controlled by reversing switch H.

In order to obtain further speed adjustment I provide means for shifting the brushes. It has been found that a displacement of the brushes of approximately 15° from the line of magnetization of the motor is the position of maximum efficiency and torque. Any greater displacement results in a smaller consumption of current, a lower torque and a lower speed. I take advantage of this fact to secure the additional speed control of the motors. By displacing the brushes more than 15° from the line of magnetization a small consumption of current and a suitable torque at starting is obtained. Then by gradually shifting the brushes to the position of maximum efficiency the full speed for the series connection of the motors is obtained. I then open the circuit and again displace the brushes. The motors are then connected in parallel and the brushes are again gradually shifted to the position of maximum efficiency, thus obtaining the full speed for parallel connection. For starting I use a displacement of the brushes of approximately 30°, or double the displacement for full speed. The manner in which this method of speed control is combined with the reversal by changing the connections of the motor is illustrated in Fig. 7. In this figure the line connecting the poles 1 1 represents the line of magnetization of the motor when the upper left-hand tap of the motor in Fig. 5 is connected to the source of supply. The line connecting poles 2 2 represents the line of magnetization of the motor when the other upper tap is connected to the source of supply. The line 3 3 displaced approximately 15° from the line 1 1 represents the position of maximum efficiency for the magnetization 1 1. The line 4 4 represents the position of maximum efficiency for the reverse rotation when the magnetization is on the line 2 2. The line 5 5, which is displaced approximately 30 degrees from both lines 1 1 and 2 2, represents the starting position of the brushes for either direction of rotation. Thus if the brushes are placed in the central position on line 5 5 and either of the above taps of motors M′ and M² in Fig. 5 are connected to the source of supply, the brushes will be in the proper position for starting. The means for shifting the brushes from the line 5 5 to line 3 3 or 4 4, according to the direction of rotation, forms part of the control circuit, which will now be explained.

Referring again to Fig. 5, J represents in development the main-controlling cylinder, having the movable contacts $j'$, $j^2$, $j^3$, and the stationary contacts $k'$, $k^2$, etc. Reversing switch N is mechanically interlocked with control switch J in the ordinary manner. The means for interlocking the two switches is not shown, since numberless interlocking devices for controlling cylinders and reversing switches are well known to the art, and any well known form of interlock may be used. U' and U² represent diagrammatically the brush-shifting mechanism for the motors M' and M² respectively, which are controlled by the coils $v'$, $v^2$, etc. This controlling mechanism will be explained hereafter; for the present it is sufficient to understand that as coils $v'$, $v^2$ and $v^3$ are energized in turn, the brush-shifting mechanisms U' and U² will be shifted step by step in one direction or the other. Now assume the reversing switch N to be moved so that the movable contacts $n'$ to $n^4$, corresponding to the forward position of the motors as indicated by the letter F, are in engagement with the stationary contacts $o'$, $o^2$, etc., and assume the control cylinder J to be moved so that the contact fingers $k'$, $k^2$, etc. are in engagement with the movable contacts on the line IX: two different circuits are now closed across the transformer secondary $C^2$; the current passing from the upper end of transformer secondary $C^2$ divides; one circuit passes to the stationary contact $k^3$, to contact segments $j^2$, to contact $k^8$, through coil S of switch B, through contacts $s$ $s$ to contact $k^2$, to contact segments $j'$, to contact $k'$, and back to the left-hand side of transformer secondary $C^2$. Coil S is the operating coil for series-parallel switch B to throw it into the series position. Coil P is the controlling coil for the same switch to throw it into the parallel position. Thus by the passage of current through coil S, switch B is thrown into the series position, with contact-fingers $b'$ and $b^2$ in contact with segment $d'$; $b^3$ and $b^4$ in contact with $d^2$; and $d^5$ in contact with $b^5$ and $b^6$.

The second circuit from transformer secondary $C^2$ passes to contact finger $o'$, to segment $n'$, to contact $o^2$, to coil F' of switch H, to contact finger $k^2$, to segment $j'$, to contact finger $k'$ and transformer secondary $C^2$.

Coils F' and R' are the controlling coils for the reversing switch H, throwing either set of movable contacts into engagement with the stationary contact fingers. Thus the second control circuit connects the motors for their forward direction of rotation. The motors are now connected in series position and the field coils are connected for forward rotation, but the main switch A is as yet open and no current passes through the working circuit. If now controlling switch J be moved to the second position 2X, an additional circuit will be closed. Current now passes from the right-hand end of transformer secondary $C^2$, through contact-finger $k^3$, to segment $j^2$, to contact-finger $k^4$, to contact $b^6$, to contact $d^5$, to contact $b^5$, to coil $a$ of switch A, to contact-finger $k^2$, to contact segment $j'$, to contact-finger $k'$, to transformer secondary $C^2$. This circuit is closed through coil $a$. Coil $a$ is the operating coil for main switch A and raises the switch-bar into engagement with its contacts, closing the work circuit. The switch-bar is arranged to engage contacts $s$ $s$ and $p$ $p$ when it is in its lower position. Thus when switch A is raised to close the working circuit, the circuits of coils S and P are open at contacts $s$ and $p$. Thus any change from series position of series-parallel switch B is prevented as long as main switch A is closed. Thus main switch A and series-parallel switch B are interlocked. Switch A cannot be closed until switch B is moved into either the series or parallel position so that contacts $b^5$ and $b^6$ engage contacts $d^5$ or $d^6$, and on the other hand switch B cannot be moved except when switch A is open and the circuits of coils S and P are closed at contacts $s$ and $p$. The work circuit is opened and closed only by main switch A. Main switch A may accordingly be designed to withstand any tendency to arcing, while the series-parallel switch may be of simple construction since it never opens or closes the circuit under load. It will further be noticed that the reversing switch H is never called upon to open the work circuit under load, since it can be moved only when main reversing switch N is operated, and switch N is mechanically interlocked with main-controlling switch J, so that it cannot be operated except when control switch J is in the off position, and consequently main switch A is open.

Returning to the consideration of the circuits, the connections for the second position of switch J have been described. The working circuit is closed and the motors start at their lowest speed for series position, for the brushes are displaced to the starting position. If now switch J is moved to the position 3X, only one change occurs. A new circuit is now established as follows: from the upper end of transformer secondary $C^2$, to contact $k^3$, to segment $j^2$, to contact $k^5$, to contact $o^{10}$, to contact $n^4$, to contact $o^{11}$, through the two coils $v'$ in parallel to contact $k^2$, to segment $j'$, to contact $k'$, to transformer secondary $C^2$. Thus by the energizing of coils $v'$ the brushes are moved one step nearer to their running position, and the speed of the motor is increased. As switch J is moved to positions 4X and 5X, the circuit is closed through coils $v^2$ and $v^3$ respectively, and when switch J is on the position 5X the motors are operating at their maximum speed for series connection. If now the switch J is moved to the position 5X', the circuit is broken through coil $a$ controlling the main switch and through coils $v'$, $v^2$, etc. Main switch A thus falls and opens the work circuit, while brush-shifting mechanisms U', U² etc. are returned by their springs to the starting position, as will be hereinafter described. By the opening of main switch A the circuits of coils S and P are again closed at contacts $s$ and $p$. Now as switch J is moved to position 6X, the circuit through coil P is closed by means of contact-finger $k^9$ and segment $j^5$. Series-parallel switch B is accordingly moved to the parallel position. In moving switch J to position 7X, main switch A is again closed, closing the work circuit and opening the circuit of control coil P. In passing through the remaining positions of switch J, coils $v'$, $v^2$ etc. will again be serially energized and the motors will be brought to full speed for the parallel connections.

It is evident that any number of main switches, series-parallel switches and brush-shifting coils may be controlled by one control switch J, all the main switches being electrically interlocked with the series-parallel switches as has been already described. Furthermore, any number of reversing switches H may be controlled by the main reversing switch N mechanically interlocked with the main control switch J.

It remains only to describe the mechanism by which the step-by-step shifting of the brushes is obtained. This mechanism is illustrated in Figs. 6 and 8. 10 10 represent the brushes bearing on the commutator 11 and carried by the ring 12, which is mounted so as to be capable of rotation around the commutator 11 in the ordinary manner of brush-holders. The support, which may be of any well known type, is not shown. Ring 12 carries the gear rack 13 which is engaged by gear 14 mounted on the frame of the machine. Gear 14 carries on its shaft the pinion 15, which engages the rack 16, which is capable of longitudinal movement in the guides 17 mounted on the support 18, which may be attached to the frame of the machine. Rack 16 is normally held in the central position as shown by the helical compression springs 19. Rack 16 carries at its ends the magnet coils $v^4$ and $v^6$. One form of magnet coil suited to this purpose is shown in Fig. 8, consisting of the coil $v^4$ mounted on the laminated core 20, which in turn is screwed to the plate 21. The plate supporting magnet coils $v^5$ in Fig. 6 serves as the armature for coils $v^4$. Thus when coils $v^4$ are energized, an attractive force is produced between the back plate supporting coils $v^5$ and coils $v^4$. Since the plate supporting coils $v^5$ is prevented from movement by the stop 22, magnet coils $v^4$ move to the right drawing with them the rack 16. Thus pinion 15 and gear 14 are rotated, rack 13 is moved to the right, and brushes 10 10 are rotated a short distance in a clock-wise direction. If now coils $v^5$ are energized they exert an attraction upon the iron plate carrying coils $v^4$. This plate is prevented from movement by stop 23, and consequently coils $v^5$ move to the right, advancing rack 13 and brushes 10 10 another step. If now coils $v^6$ are energized they will be drawn up against the end of frame 18 carrying rack 16 and brushes 10 10 into the full speed position. Thus a gradual shifting of the brushes from starting position to full speed position is obtained. As the coils $v^4$, $v^5$ and $v^6$ are deënergized in the order named, or simultaneously, spring 19 will restore rack 16 and brushes 10 10 to the starting position. If coils $v^1$, $v^2$ and $v^3$ are energized, brushes 10 10 will be shifted step-by-step in the opposite direction of rotation. I have thus provided a simple and efficient mechanism for producing a step-by-step shifting of the brushes in either direction.

Although I have illustrated and described a control system in which the potential control is obtained by changing the motor connections from series to multiple, it will be understood that my invention is not limited to this particular arrangement; neither is it necessary that the particular control system which I have illustrated should contain all the elements illustrated and described or elements having the specific form shown. Accordingly, I do not desire to limit myself to the particular system of control or the particular arrangement of parts herein shown, and I aim to cover in the claims hereto appended all arrangements and modifications which do not involve a departure from the spirit and scope of my invention.

What I claim as new and desire to secure by Letters Patent of the United States, is:

1. In combination, a plurality of repulsion motors, means for varying the series-parallel relation of said motors, and means for varying the relative angular displacement between the line of the primary field and the line of the short-circuiting brushes on the secondary member.

2. In combination, a plurality of repulsion motors, a switch adapted to vary the series-parallel relation of said motors, a brush-shifting device, and means for controlling said switch and said device from a distance.

3. In combination, a plurality of repulsion motors, a series-parallel switch adapted to vary the relative connections of said motors, a reversing switch adapted to vary the field connections of said motors, brush-shifting devices, and means for controlling said switches and said devices from a distance.

4. In combination, a plurality of repulsion motors, switches included in the circuit of said motors, and a control system comprising means for operating said switches and for shifting the brushes of said motors.

5. In combination, a plurality of repulsion motors, switches included in the circuit of said motors, a master-controller, and devices operated by the movement of said controller and adapted to operate said switches and to shift the brushes of said motors.

6. In combination, a plurality of repulsion motors, a series-parallel switch therefor, brush-shifting devices therefor, a control system for said switch and said devices, and a master-controller for said system arranged to connect said motors in series, then to move the brushes of said motors from maximum to minimum displacement, then to return said brushes to their maximum displacement and to connect the motors in parallel, and then to move the brushes to minimum displacement.

7. In combination, a plurality of repulsion motors, a series-parallel switch, a reversing switch, brush-shifting devices, and a control system adapted to operate said switches and said devices.

8. In combination, a plurality of repulsion motors, a series-parallel switch, brush-shifting devices, a control system for said switch and said devices, and a master-controller for said system arranged when in its first position to place said switch in its series position and to displace the brushes of the motors their maximum distance from running position, then by its movement to shift said brushes to running position, then to displace said brushes and place said switch in its parallel position, and then to shift said brushes to running position.

9. In combination, a plurality of repulsion motors, a circuit comprising the fields of said motors and controlling switches therefor, and a control system comprising means for operating said switches and for shifting the brushes of said motors.

10. In combination, a plurality of repulsion motors, a circuit comprising the fields of said motors, a series-parallel switch and a reversing switch, and a control system comprising means for operating said switches and for shifting the brushes of said motors.

11. In combination, a plurality of repulsion motors, a series-parallel switch, a reversing switch, brush-shifting devices, operating means for said switches and devices, a master-controlling switch adapted to control said operating means, and a second controlling switch adapted to vary the connections between said master switch and the operating means for said reversing switch and for said brush-shifting devices.

12. In combination, a repulsion motor, a support for the brushes thereof, means for returning said support to a given position, means for producing a field magnetization displaced from, and on either side of, said brush position, and electro-responsive means for shifting the brushes from said position toward the line of said magnetization.

13. In combination, a repulsion motor, means for shifting the magnetization thereof, and two series of electromagnetic devices adapted to shift the brushes of said motor step-by-step in either direction.

14. In a brush-shifting mechanism, a rotatable brush support, a member adapted by its movement to rotate said support, means for returning said member to a given position, and a series of electromagnets and armatures therefor restrained from movement in a given direction, one of said electromagnets being secured to said member.

15. In a brush-shifting mechanism, a rotatable brush support, springs arranged to return said support to a given position, and a series of electromagnets and armatures therefor adapted when serially energized to rotate said support step-by-step.

16. In combination, a plurality of repulsion motors, a work circuit comprising the fields of said motors and controlling switches therefor, a control circuit comprising electro-responsive devices for operating said switches and for shifting the brushes of said motors, and a master-controlling switch adapted to vary the circuit connections of said devices.

17. The method of controlling a plurality of repulsion motors, which consists in varying the displacement of the brushes of the motors from the line of field magnetization and varying the series-parallel relations of said motors.

18. The method of controlling a plurality of repulsion motors, which consists in connecting the motors in series to a source of current with the brushes of the motors displaced a maximum distance from the line of field magnetization, then shifting the brushes toward the line of magnetization, then displacing the brushes and connecting the motors in parallel, and then shifting the brushes toward the line of magnetization.

19. The method of controlling a plurality of motors, which consists in displacing the brushes from running position and connecting the motors in series to the source of current, then shifting the brushes to running position, then displacing the brushes and connecting the motors in parallel, and then shifting the brushes to running position.

20. The method of controlling the operation of repulsion motors, which consists in varying the angular displacement between the line of the primary field and the line of the short-circuiting brushes to vary the speed and torque of the motor within certain limits, and varying the potential at the motor terminals to increase the range of control.

21. The method of controlling the operation of repulsion motors, which consists in applying varying potentials to the motor terminals and for each potential applied varying the speed and torque of the motors by varying the angular displacement between the primary field and the line of the short-circuiting brushes.

22. The method of controlling the operation of repulsion motors, which consists in starting the same with the commutator brushes displaced by a maximum angle from the line of the primary field and with a minimum potential impressed on the motor terminals, then gradually reducing the shift of the brushes, then returning said brushes to the maximum angle and increasing the potential at the motor terminals, and finally again gradually reducing the shift of the brushes.

In witness whereof I have hereunto set my hand this 22nd day of January, 1904.

CHARLES P. STEINMETZ.

Witnesses:
BENJAMIN B. HULL,
HELEN ORFORD.